United States Patent
Moon et al.

(10) Patent No.: US 11,483,128 B2
(45) Date of Patent: Oct. 25, 2022

(54) HOMOMORPHIC ENCRYPTION DEVICE AND CIPHERTEXT ARITHMETIC METHOD THEREOF

(71) Applicant: SAMSUNG ELECTRONICS CO., LTD., Suwon-si (KR)

(72) Inventors: Youngsik Moon, Hwaseong-si (KR); Hongrak Son, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/126,935

(22) Filed: Dec. 18, 2020

(65) Prior Publication Data
US 2021/0376996 A1 Dec. 2, 2021

(30) Foreign Application Priority Data
May 29, 2020 (KR) .................. 10-2020-0065187

(51) Int. Cl.
| | |
|---|---|
| *H04L 9/06* | (2006.01) |
| *H04L 9/08* | (2006.01) |
| *H04L 9/30* | (2006.01) |
| *H04L 9/12* | (2006.01) |
| *H04L 9/00* | (2022.01) |

(52) U.S. Cl.
CPC ............ *H04L 9/008* (2013.01); *H04L 9/0618* (2013.01); *H04L 9/0891* (2013.01)

(58) Field of Classification Search
CPC ..... H04L 9/008; H04L 9/0618; H04L 9/0891; H04L 9/3093; H04L 9/12; H04L 2209/046
See application file for complete search history.

(56) References Cited

U.S. PATENT DOCUMENTS

| | | | |
|---|---|---|---|
| 8,515,058 B1 * | 8/2013 | Gentry | .................. H04L 9/008 380/28 |
| 9,716,590 B2 | 7/2017 | Gentry | |

(Continued)

FOREIGN PATENT DOCUMENTS

| | | |
|---|---|---|
| KR | 101449239 | 10/2014 |
| KR | 101861089 | 5/2018 |

(Continued)

OTHER PUBLICATIONS

Alchemy: A Language and Compiler for Homomorphic Encryption Made easY by Crockett et al. (Year: 2018).*

(Continued)

*Primary Examiner* — Vu V Tran
(74) *Attorney, Agent, or Firm* — Volentine, Whitt & Francos, PLLC

(57) ABSTRACT

A homomorphic encryption device includes: a recryption parameter generating circuit, a recryption circuit, and an arithmetic circuit. The recryption parameter generating circuit is configured to generate a recryption parameter including a plurality of recryption levels respectively for a plurality of ciphertexts based on an arithmetic scenario including information about an arithmetic schedule between the plurality of ciphertexts. The recryption circuit is configured to generate a plurality of recrypted ciphertexts by recrypting each of the plurality of ciphertexts to a corresponding recryption level based on the recryption parameter. The arithmetic circuit is configured to output an arithmetic result by performing operations by using the plurality of recrypted ciphertexts, according to the arithmetic scenario.

19 Claims, 14 Drawing Sheets

(56) References Cited

U.S. PATENT DOCUMENTS

| | | | |
|---|---|---|---|
| 10,447,476 | B2 | 10/2019 | Chew |
| 10,541,805 | B2 | 1/2020 | Laine et al. |
| 2011/0110525 | A1* | 5/2011 | Gentry .................. H04L 9/008 380/285 |
| 2016/0036584 | A1 | 2/2016 | Nikolaenko et al. |
| 2016/0254912 | A1* | 9/2016 | Maniatakos ............ H04L 9/321 713/168 |
| 2018/0359079 | A1 | 12/2018 | Hu et al. |
| 2019/0363872 | A1 | 11/2019 | Shim et al. |

FOREIGN PATENT DOCUMENTS

| | | |
|---|---|---|
| KR | 101919940 | 11/2018 |
| KR | 101965628 | 4/2019 |
| KR | 102040106 | 11/2019 |

OTHER PUBLICATIONS

Sai Sri Sathya et al: "A Review of Homomorphic Encryption Libraries for Secure Computation", Arxiv.org, Cornell University Library, 201 Olin Library Cornell University Ithaca, NY 14853, Dec. 6, 2018 (Dec. 6, 2018), XP080989841, * section 2.2; p. 2 *.
Gentry Craig et al: "Homomorphic Encryption from Learning with Errors: Conceptually-Simpler, Asymptotically-Faster, Attribute-Based" In: "Advances in Intelligent Data Analysis XIX", Jan. 1, 2013 (Jan. 1, 2013), Springer International Publishing, Cham, XP055782388, ISSN: 0302-9743 ISBN: 978-3-030-715.
European Search Report dated Jun. 17, 2021, cited in EP Patent Application No. 20217765.5.

\* cited by examiner

FIG. 6

| SNR_A | | |
|---|---|---|
| Operation | Operation | Cons_L |
| OP1 | CT1 * CT2 → RST_M | 3 |
| OP2 | RST_M * CT3 → RST | 5 |

FIG. 8

| Parameter Mapping Table (PMT) | |
|---|---|
| Combination of Operations | Recryption Parameter |
| CO_1 | P_R_1 {RL_1 = L11, RL_2 = L21, RL_3 = L31} |
| CO_2 | P_R_2 {RL_1 = L12, RL_2 = L22, RL_3 = 32} |
| ⋮ | ⋮ |
| CO_N | P_R_N |

| \multicolumn{3}{|c|}{SNR_A} |
|---|---|---|
| Operation | Operation | Cons_L |
| OP1 | CT1 * CT2 → RST_M | 7 |
| OP2 | RST_M * CT3 → RST | 5 |

HOMOMORPHIC ENCRYPTION DEVICE AND CIPHERTEXT ARITHMETIC METHOD THEREOF

CROSS-REFERENCE TO RELATED APPLICATION

This U.S. nonprovisional patent application claims the benefit of priority under 35 U.S.C. § 119 to Korean Patent Application No. 10-2020-0065187, filed on May 29, 2020 in the Korean Intellectual Property Office, the disclosure of which is incorporated herein in its entirety by reference.

BACKGROUND

1. Technical Field

The inventive concept(s) described herein relate to a homomorphic encryption device and a ciphertext arithmetic method performed by the homomorphic encryption device. More particularly, the inventive concept(s) described herein relate to a homomorphic encryption device for recrypting a ciphertext and performing an operation by using the recrypted ciphertext, and a ciphertext arithmetic method performed by the homomorphic encryption device.

2. Description of the Related Art

Along with the development of communication technology and the wide use of electronic devices, continuous efforts have been made to maintain communication security between electronic devices. As a result, encryption/decryption techniques have been used in most modern electronic communication environments.

When messages encrypted by encryption techniques are transferred to counterparts, the counterparts decrypt the encrypted messages to make use of the messages. In this case, hacking by third parties may occur when the counterparts have temporarily decrypted the messages for computation. As a result, the decrypted messages may be easily leaked to the third parties.

To solve such issues, homomorphic encryption methods have been studied. Ciphertext is the result of encryption performed on plaintext using an encryption algorithm. According to homomorphic encryption methods being studied, various arithmetic operations may be performed on ciphertexts while the ciphertexts are not decrypted.

SUMMARY

The inventive concept(s) described herein provide a homomorphic encryption device and a ciphertext arithmetic method performed by the homomorphic encryption device. The homomorphic encryption device and the ciphertext arithmetic method allow a reduction in the amount of computations in recryption and an improvement in the operating speed of the homomorphic encryption device.

According to an aspect of the present disclosure, a homomorphic encryption device includes a recryption parameter generating circuit, a recryption circuit, and an arithmetic circuit. The recryption parameter generating circuit is configured to, based on an arithmetic scenario including information about an arithmetic schedule between a plurality of ciphertexts, generate a recryption parameter including a plurality of recryption levels respectively for the plurality of ciphertexts. The recryption circuit is configured to generate a plurality of recrypted ciphertexts by recrypting each of the plurality of ciphertexts to a corresponding recryption level, based on the recryption parameter. The arithmetic circuit is configured to output an arithmetic result by performing operations by using the plurality of recrypted ciphertexts, according to the arithmetic scenario.

According to another aspect of the present disclosure, a ciphertext arithmetic method is performed by a homomorphic encryption device. The ciphertext arithmetic method includes determining a plurality of recryption levels for a plurality of ciphertexts, based on an arithmetic scenario including information about an arithmetic schedule for the plurality of ciphertexts. The ciphertext arithmetic method also includes recrypting each of the plurality of ciphertexts to a corresponding recryption level from among the plurality of recryption levels; and outputting an arithmetic result by performing operations including at least one multiplication operation by using a plurality of recrypted ciphertexts. At least two of the plurality of recryption levels are different from each other.

According to yet another aspect of the present disclosure, a homomorphic encryption device includes a memory, a recryption generating circuit, a recryption circuit, and an arithmetic circuit. The memory stores a parameter mapping table that includes a plurality of recryption parameters corresponding to a plurality of operation combinations. The recryption parameter generating circuit is configured to generate a recryption parameter including a plurality of recryption levels for a plurality of ciphertexts, based on comparing the parameter mapping table provided from the memory with an operation combination for the plurality of ciphertexts. The operation combination is included in an arithmetic scenario. The recryption circuit is configured to generate a plurality of recrypted ciphertexts by recrypting each of the plurality of ciphertexts to a corresponding recryption level from among the plurality of recryption levels, based on the recryption parameter. The arithmetic circuit is configured to output an arithmetic result by computing the plurality of recrypted ciphertexts according to the operation combination for the plurality of ciphertexts. Each of the plurality of recryption parameters included in the parameter mapping table includes information about levels optimized such that a level of the arithmetic result is minimized according to a corresponding operation combination from among the plurality of operation combinations.

According to yet another aspect of the present disclosure, a ciphertext arithmetic method is performed by a homomorphic encryption device. The ciphertext arithmetic method includes receiving a plurality of ciphertexts from outside the homomorphic encryption device, based on types and orders of operations required between the plurality of ciphertexts. The ciphertext arithmetic method also includes recrypting the plurality of ciphertexts to recryption levels respectively corresponding to the plurality of ciphertexts such that an arithmetic result includes no preliminary text; and outputting the arithmetic result including no preliminary text by performing operations including at least one multiplication operation by using the plurality of recrypted ciphertexts.

According to yet another aspect of the present disclosure, a ciphertext arithmetic method is performed by a homomorphic encryption device. The ciphertext arithmetic method includes receiving a plurality of ciphertexts, based on an arithmetic scenario including information about at least one operation between the plurality of ciphertexts. The ciphertext arithmetic method also includes determining a level consumption quantity for each of the at least one operation. For each of the plurality of ciphertexts, the ciphertext arithmetic method includes determining a sum of level consumption quantities of at least one operation performed on a corresponding ciphertext, as a recryption level that corresponds to the corresponding ciphertext. For each of the plurality of ciphertexts, the ciphertext arithmetic method includes generating a plurality of recrypted ciphertexts by recrypting the corresponding ciphertext to the determined recryption level corresponding to the corresponding ciphertext. The ciphertext arithmetic method further includes outputting an arithmetic result by performing operations by using the plurality of recrypted ciphertexts.

BRIEF DESCRIPTION OF THE DRAWINGS

Embodiments of the present disclosure will be more clearly understood from the following detailed description taken in conjunction with the accompanying drawings in which:

FIG. 6 illustrates an arithmetic scenario according to an example embodiment of the present disclosure;

FIG. 8 illustrates a parameter mapping table according to an example embodiment of the present disclosure;

FIG. 10 illustrates an arithmetic scenario according to an example embodiment of the present disclosure;

DETAILED DESCRIPTION OF THE EMBODIMENTS

Hereinafter, embodiments of the present disclosure will be described in detail with reference to the accompanying drawings.

Figure 1:
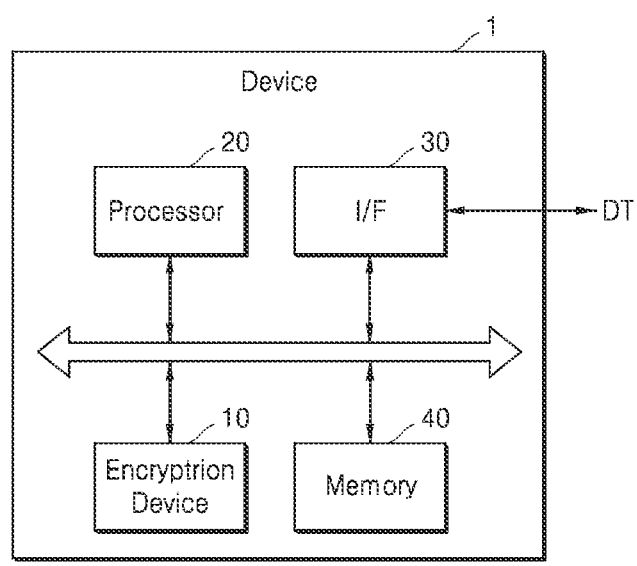
FIG. 1 illustrates a device according to an example embodiment of the present disclosure.

FIG. 1 illustrates a device 1 according to an example embodiment of the present disclosure. The device 1 may include an encryption device 10, a processor 20, an interface 30, and a memory 40. The device 1 may transmit data DT to and receive the data DT from the outside thereof. For example, the device 1 may transmit the data DT to and receive the data DT from a smart card, a memory card, or another device.

The device 1 may be implemented by various electronic devices or may be included in various electronic devices. For example, the electronic devices may include a drone, a robot device such as an advanced driver assistance system (ADAS), a smart television (TV), a smart phone, a medical device, a mobile device, an image display device, a measuring device, an Internet-of-Things (IoT) device, and the like. In addition, the device 1 may also be implemented by a storage device shown in FIG. 13.

The encryption device 10 may encrypt and/or decrypt the data DT received from outside the device 1. The encryption device 10 may maintain the security of the data DT by performing an encryption operation based on an encryption algorithm. The encryption algorithm may be, for example, an algorithm generating encrypted data by using an encryption key. In many embodiment described herein the encryption algorithm may be a homomorphic encryption algorithm.

The memory 40 may store instructions and the data DT. The processor 20 may execute the instructions to process the data DT in accordance with the instructions. When executed by the processor 20, the instructions may cause the device 1 to perform or otherwise implement aspects of methods described herein.

The processor 20 may transmit the data DT to and receive the data DT from the outside of the device 1 via the interface 30. The processor 20 may execute instructions to perform a task and may store a result thereof in the memory 40. As an example, the processor 20 may include a plurality of cores.

The memory 40 may store various pieces of data required for operations of the processor 20. The memory 40 may be implemented by, for example, dynamic random access memory (DRAM), mobile DRAM, static RAM (SRAM), phase change RAM (PRAM), ferroelectric RAM (FRAM), resistive RAM (RRAM), and/or magnetic RAM (MRAM).

In an embodiment, the encryption device 10 may process a ciphertext encrypted according to a homomorphic encryption technique. For convenience of description, a "ciphertext encrypted according to the homomorphic encryption technique" as the term is used herein may be referred to as a homomorphic ciphertext. For example, the encryption device 10 may perform an operation by using a plurality of ciphertexts. When encrypted according to homomorphic encryption techniques, the plurality of ciphertexts become corresponding homomorphic ciphertexts.

A homomorphic ciphertext may include a preliminary text, a message, and an error (or noise) which is due to the nature of the homomorphic encryption technique. When a multiplication operation is performed on the homomorphic ciphertext, the length of the preliminary text may be reduced and a magnitude of an error in a ciphertext corresponding to an arithmetic result may be greater than an error in the operand ciphertext. Removal of the error in the ciphertext corresponding to the arithmetic result may be required in response to the performance of at least one multiplication operation. As a result, each time the multiplication operation is performed on the homomorphic ciphertext, the length of the preliminary text may be gradually reduced, and the potential number of multiplication operations which remain to be performed on the homomorphic ciphertext may be reduced. Accordingly, when the remaining number of possible arithmetic operations of the homomorphic ciphertext is less than an amount of required arithmetic operations, recryption on the homomorphic ciphertext for increasing the length of the preliminary text may be necessary.

For convenience of description, references to a level of the homomorphic ciphertext may correspond to the remaining number of possible arithmetic operations of the homomorphic ciphertext. The level of the homomorphic ciphertext may denote a discrete value representing the length of the preliminary text of the homomorphic ciphertext. As a non-limiting example, when a maximum level of the homomorphic ciphertext which corresponds to a maximum length of the preliminary text of the homomorphic ciphertext is 10, the level of the homomorphic ciphertext may have an integer value ranging from 0 to 10. For example, when the level of the homomorphic ciphertext is 7, seven additional multiplication operations may be performed on the homomorphic ciphertext. In this example, the level consumed by one operation is assumed to be 1, such that each of the seven additional multiplication operations would consume 1 level of the 7 remaining. However, the inventive concept(s) described herein are not limited to specific details of the level of the homomorphic ciphertext in examples described herein, and according to the type of operation or the nature of another ciphertext jointly computed, the level consumed by one operation may be 2 or more.

To perform a multiplication operation on the homomorphic ciphertexts, the operand homomorphic ciphertexts may need to have the same level. The teachings herein may be used to obtain operand homomorphic ciphertexts with the same level.

The encryption device 10 included in the device 1 according to an example embodiment of the present disclosure may determine a recryption level for each of the plurality of ciphertexts. The recryption level for each of the ciphertexts may be determined based on an arithmetic scenario including information about an arithmetic schedule for the plurality of ciphertexts. In other words, the encryption device 10 may determine a plurality of recryption levels for the plurality of ciphertexts. At least two of the plurality of recryption levels may be different from each other. In an embodiment, the arithmetic schedule for the plurality of ciphertexts may include types and orders of operations scheduled to be performed on the plurality of ciphertexts in advance. In addition, in an embodiment, the arithmetic schedule may include information about a level consumed by a scheduled operation and levels consumed by each schedule operation including when different scheduled operations consume different levels. Operations such as the recryption level determination, the recryption, and the arithmetic operation of the encryption device 10 will be described in more detail with reference to the following figures.

According to an example embodiment of the present disclosure, only the recryptions necessary for arithmetic operations required by the encryption device 10 in the device 1 may be performed. As a result, one or more unnecessary recryptions may be avoided and are not unnecessarily performed. Accordingly, the amount of computations in the recryption may be reduced. Further, as the amount of computations in the recryption is reduced, an operating speed of each of the encryption device 10 and the device 1 may be improved.

Figure 2:
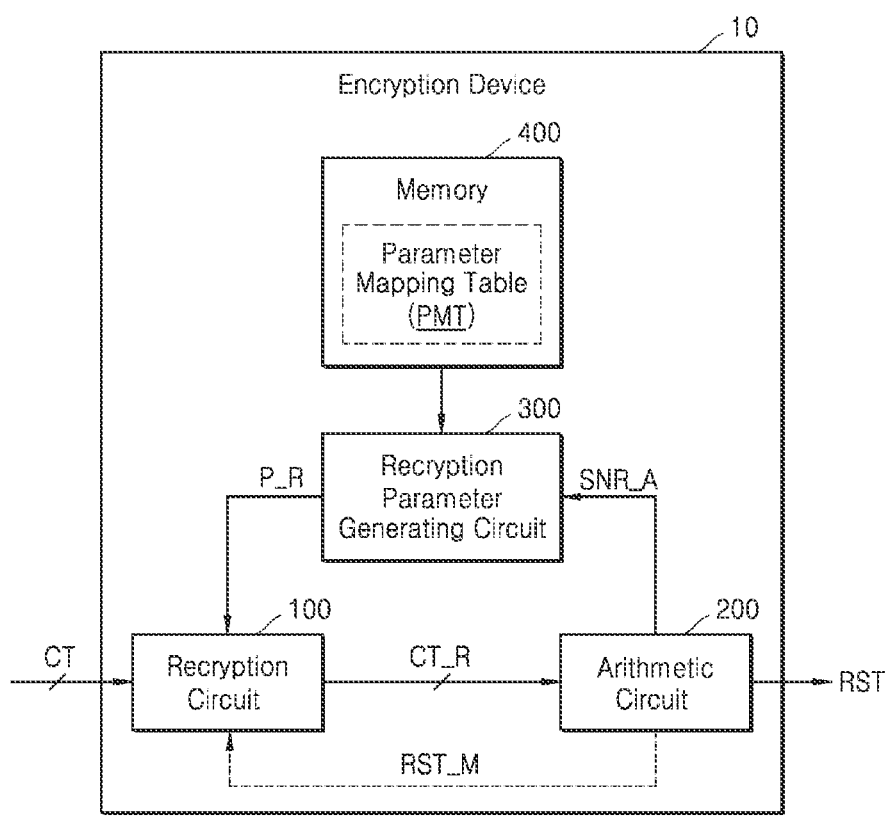
FIG. 2 illustrates an encryption device according to an example embodiment of the present disclosure.

FIG. 2 illustrates the encryption device 10 according to an example embodiment of the present disclosure. The encryption device 10 may correspond to the encryption device 10 of FIG. 1.

The encryption device 10 may include a recryption circuit 100, an arithmetic circuit 200, a recryption parameter generating circuit 300, and a memory 400.

Before proceeding, it should be clear that FIGs. herein including FIG. 2 show and reference circuitry with labels such as "circuit". As is traditional in the field of the inventive concept(s) described herein, examples may be described and illustrated in terms of circuits and blocks which carry out a described function or functions. These circuits and blocks, which may be referred to herein as a recryption circuit, an arithmetic circuit, a recryption parameter generating circuit, or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a circuit or block may be implemented by dedicated hardware, or by a processor (e.g., one or more programmed microprocessors and associated circuitry), or by a combination of dedicated hardware to perform some functions of the circuit or block and a processor to perform other functions of the circuit or block. Each circuit or block of the examples may be physically separated into two or more interacting and discrete circuits or blocks without departing from the scope of the present disclosure. Likewise, the circuits and blocks of the examples may be physically combined into more complex circuits and blocks without departing from the scope of the present disclosure.

The recryption circuit 100 may receive a plurality of ciphertexts CT from outside the encryption device 10. In other words, data received by the recryption circuit 100 may be ciphertexts CT which are already encrypted and which are already homomorphic ciphertexts. In an embodiment, the plurality of ciphertexts CT may be homomorphic ciphertexts encrypted according to the homomorphic encryption technique. The recryption circuit 100 may recrypt the plurality of ciphertexts CT, based on a recryption parameter P_R provided by the recryption parameter generating circuit 300. The recryption parameter P_R may include a plurality of recryption levels including a recryption level corresponding to each of the plurality of ciphertexts CT. The recryption circuit 100 may recrypt each of the plurality of ciphertexts CT to a corresponding recryption level from among the plurality of recryption levels included in the recryption parameter P_R. For reference, recrypting a ciphertext to a recryption level may refer to increasing the length of a preliminary text of the ciphertext such that the recrypted ciphertext has the recryption level. The recryption circuit 100 may generate a plurality of recrypted ciphertexts CT_R by recrypting the plurality of ciphertexts CT based on the recryption parameter P_R and may provide the plurality of recrypted ciphertexts CT_R to the arithmetic circuit 200.

The arithmetic circuit 200 may perform operations by using the plurality of recrypted ciphertexts CT_R provided by the recryption circuit 100. For example, the arithmetic circuit 200 may perform at least one operation included in an arithmetic scenario SNR_A that includes types and/or orders of operations. The arithmetic scenario SNR_A may be internally determined by the encryption device 10, and according to embodiments, the arithmetic scenario SNR_A may be information given or requested from outside the encryption device 10. The arithmetic circuit 200 may generate an arithmetic result RST by performing operations by using the plurality of recrypted ciphertexts CT_R and may output the arithmetic result RST. The arithmetic circuit 200 may provide the arithmetic scenario SNR_A to the recryption parameter generating circuit 300.

The recryption parameter generating circuit 300 may generate the recryption parameter P_R including the plurality of recryption levels corresponding to the plurality of ciphertexts, based on the arithmetic scenario SNR_A provided by the arithmetic circuit 200. To this end, the recryption parameter generating circuit 300 may determine the plurality of recryption levels, based on the arithmetic scenario SNR_A. The recryption parameter generating circuit 300 may provide the recryption parameter P_R to the recryption circuit 100. In an embodiment, at least two of the plurality of recryption levels may be different from each other.

A level consumption quantity refers to the quantity (e.g., number or amount) of level(s) consumed in an operation performed on a ciphertext. In an embodiment, the recryption parameter generating circuit 300 may determine level consumption quantities for at least one operation included in the arithmetic scenario SNR_A. The recryption parameter generating circuit 300 may determine the plurality of recryption levels based on the determined level consumption quantities for the at least one calculation. For example, for each of the plurality of ciphertexts, the recryption parameter generating circuit 300 may sum up the level consumption quantities of the at least one operation performed on a corresponding ciphertext and may resultingly determine a sum as a recryption level that corresponds to the corresponding ciphertext. This embodiment will be described in more detail with reference to FIG. 5, FIG. 6, FIG. 7 and FIG. 8.

In an embodiment, for a particular ciphertext from among the plurality of ciphertexts, the sum of the level consumption quantities of the at least one operation performed on the corresponding ciphertext may be greater than a maximum recryption level. A preliminary text included in a ciphertext may be limited by a maximum length which the preliminary text can have. The maximum recryption level may represent a level corresponding to the maximum length which the preliminary text included in the ciphertext can have. In this case, one recryption is not able to satisfy specifications required for the corresponding ciphertext by the arithmetic scenario SNR_A. Accordingly, the recryption parameter generating circuit 300 may divide the sum of the level consumption quantities of the at least one operation performed on the corresponding ciphertext into a plurality of levels and may schedule a plurality of recryption operations corresponding to the plurality of levels. Here, the plurality of recryption operations may be performed between the at least one operation. In an embodiment, the recryption parameter generating circuit 300 may additionally provide scheduling information for the plurality of recryption operations to the recryption circuit 100. Here, the recryption circuit 100 may receive, from the arithmetic circuit 200, an intermediate result RST_M obtained by performing some of the at least one operation and may perform the recryption on the intermediate result RST_M according to the scheduling information. This embodiment will be described in more detail with reference to FIG. 9, FIG. 10 and FIG. 11.

According to an example embodiment of the present disclosure, the encryption device 10 may determine the recryption level for each of the plurality of ciphertexts CT, based on the arithmetic scenario SNR_A including the information about the arithmetic schedule that includes the types and/or orders of operations for the plurality of ciphertexts CT, and may recrypt each of the plurality of ciphertexts CT to the determined recryption level. Only the recryptions necessary for arithmetic operations required by the encryption device 10 may be performed. As a result, one or more recryptions may be avoided and are not unnecessarily performed. Accordingly, the amount of computations in the recryption may be reduced. Further, as the amount of computations in the recryption is reduced, an operating speed of each of the encryption device 10 and the device 1 may be improved.

Figure 3:
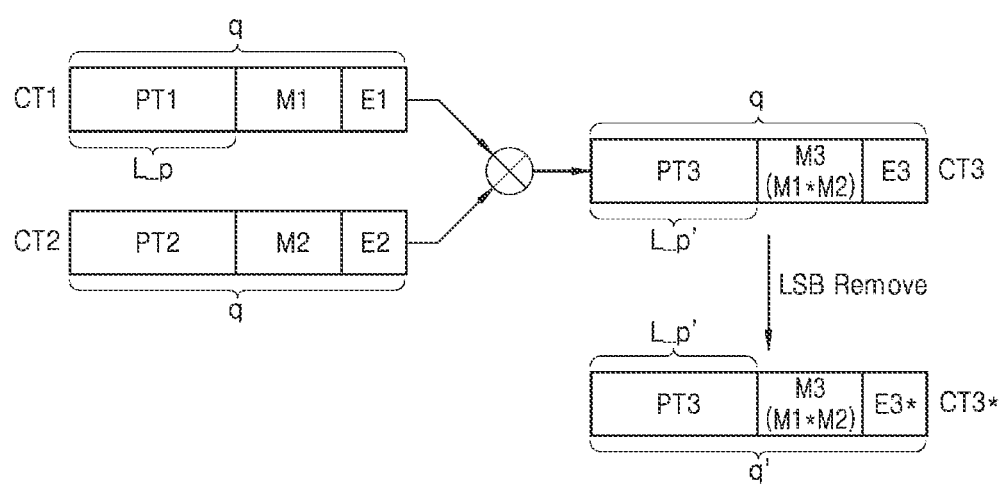
FIG. 3 is a diagram illustrating homomorphic encryption according to an example embodiment of the present disclosure.

FIG. 3 is a diagram illustrating a multiplication operation for ciphertexts in accordance with the homomorphic encryption technique, according to an example embodiment of the present disclosure. Regarding FIG. 3, descriptions will be made with reference to FIG. 3 together with FIG. 2.

The encryption device 10 may perform a multiplication operation by using a first ciphertext CT1 and a second ciphertext CT2. Here, the first ciphertext CT1 may include a first preliminary text PT1, a first message M1, and a first error E1. The length of the first preliminary text PT1 may correspond to a length L_p, and the length of the first ciphertext CT1 may correspond to a modulus q. As used herein, the term "modulus" may refer to a fixed predefined value. Likewise, the second ciphertext CT2 may include a second preliminary text PT2, a second message M2, and a second error E2. The length of the second preliminary text PT2 may correspond to the length L_p, and the length of the second ciphertext CT2 may correspond to the modulus q. Because a multiplication operation needs to be performed on the first ciphertext CT1 and the second ciphertext CT2, the length of the first ciphertext CT1 may be equal to the length of the second ciphertext CT2. In other words, a level of the first ciphertext CT1 may be equal to a level of the second ciphertext CT2.

The encryption device 10 may generate a third ciphertext CT3 by performing the multiplication operation by using the first ciphertext CT1 and the second ciphertext CT2. The third ciphertext CT3 may include a third preliminary text PT3, a third message M3, and a third error E3. The length of the third preliminary text PT3 may correspond to a modified length L_p' that is less than the length L_p, and the third message M3 may correspond to the product of the first message M1 and the second message M2. The magnitude of the third error E3 may be greater than that of the first error E1 and that of the second error E2. When an error of a ciphertext is excessively large, because there is a concern about the deterioration in reliability of the ciphertext, the encryption device 10 may obtain a modified third error E3* by removing some of least significant bits (LSBs) of the third error E3 included in the third ciphertext CT3. The encryption device 10 may obtain a modified third ciphertext CT3* including the third preliminary text PT3, the third message M3, and the modified third error E3*. The length of the modified third ciphertext CT3* may correspond to a modulus q' and may be less than the modulus q of the third ciphertext CT3. The length of the modulus q' may be fixed and predetermined due to knowledge of the result of performing the multiplication operation by using the first ciphertext CT1 and the second ciphertext CT2 with the known and predetermined length of the modulus q.

In the following descriptions, for convenience of description, an operation of performing operations, which includes a multiplication operation, on ciphertexts and then removing some of LSBs of an error will be referred to as a multiplication and recryption (MAR) operation.

As described above, when the operation including the multiplication operation is performed on the first ciphertext CT1 and the second ciphertext CT2, as in the modified third ciphertext CT3* that is a final result ciphertext, the length of the preliminary text may be reduced. Accordingly, as described above, to perform required operations, some or all of the plurality of ciphertexts CT are required to be recrypted. As also described above, the recryption may increase length of the preliminary text in the ciphertexts CT.

Figure 4:
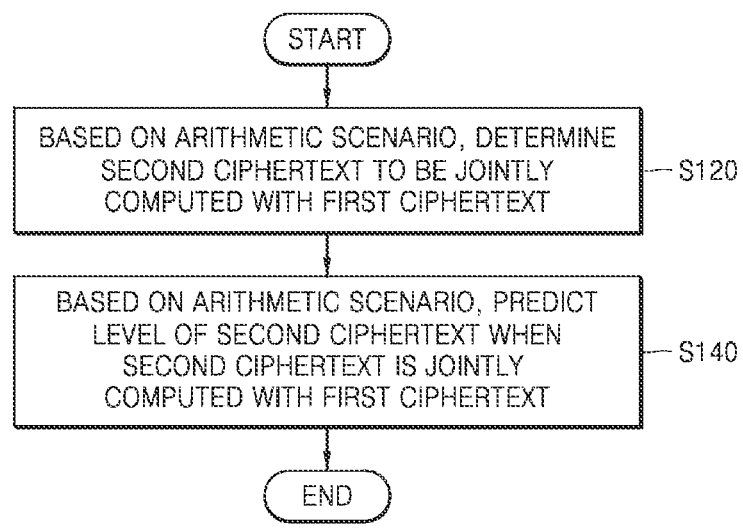
FIG. 4 illustrates a flowchart of a ciphertext arithmetic method performed by an encryption device, according to an example embodiment of the present disclosure.

FIG. 4 illustrates a flowchart of a ciphertext arithmetic method performed by an encryption device, according to an example embodiment of the present disclosure. Regarding FIG. 4, descriptions will be made with reference to FIG. 4 together with FIG. 2.

The encryption device 120 may determine the second ciphertext to be jointly computed with the first ciphertext, based on the arithmetic scenario (S120). The encryption device 10 may recrypt each of the plurality of ciphertexts CT to a recryption level determined for the corresponding ciphertext, based on the arithmetic scenario SNR_A. For example, the recryption parameter generating circuit 300 in FIG. 2 may determine a plurality of recryption levels corresponding to the plurality of ciphertexts CT based on the arithmetic scenario SNR_A and may provide the recryption parameter P_R including the plurality of recryption levels to the recryption circuit 100 in FIG. 2. The recryption circuit 100 may recrypt the plurality of ciphertexts CT based on the plurality of recryption levels included in the recryption parameter P_R. For example, the recryption circuit 100 may recrypt each of the plurality of ciphertexts CT to a recryption level corresponding to the corresponding ciphertext CT.

The encryption device 10 may predict a level of the second ciphertext when the second ciphertext is jointly computed with the first ciphertext, based on the arithmetic scenario (S140). The encryption device 10 may output the arithmetic result RST by performing operations by using the plurality of recrypted ciphertexts CT_R. For example, the recryption circuit 100 may provide the plurality of recrypted ciphertexts CT_R to the arithmetic circuit 200 in FIG. 2, and the arithmetic circuit 200 may output the arithmetic result RST by performing operations by using the plurality of recrypted ciphertexts CT_R.

Figure 5:
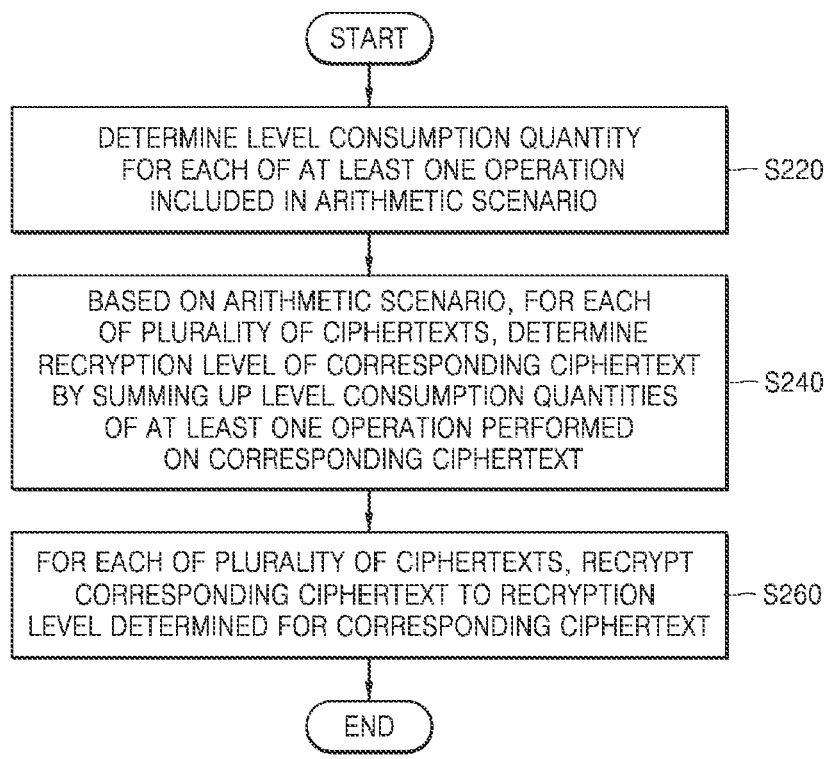
FIG. 5 illustrates a flowchart of a ciphertext arithmetic method performed by an encryption device, according to an example embodiment of the present disclosure.

FIG. 5 illustrates a flowchart of a ciphertext arithmetic method performed by an encryption device, according to an example embodiment of the present disclosure. In particular, FIG. 5 may illustrate a flowchart according to an embodiment of operation S120 of FIG. 4. Regarding FIG. 5, descriptions will be made with reference to FIG. 5 together with FIG. 2.

The encryption device 10 may determine a level consumption quantity for each of the at least one operation included in the arithmetic scenario SNR_A (S220). For example, the recryption parameter generating circuit 300 in FIG. 2 may identify the at least one operation for the plurality of ciphertexts CT, the at least one operation being included in the arithmetic scenario SNR_A, and may determine the level consumption quantity for each of the at least one operation. Here, the level consumption quantity may refer to a level quantity corresponding to the length of LSBs removed in response to the performance of the corresponding operation.

The encryption device 10 may determine a recryption level of corresponding ciphertext for each of a plurality of ciphertexts based on the arithmetic scenario (S240). The determinations of recryption levels at S240 may be performed by summing up level consumption quantities of at least one operation performed on corresponding ciphertext. That is, at S240, for each of the plurality of ciphertexts CT, the encryption device 10 may sum up the level consumption quantities of the at least one operation performed on the corresponding ciphertext, based on the arithmetic scenario SNR_A. The encryption device 10 may determine the sum as the recryption level that corresponds to the corresponding ciphertext. The at least one operation performed on the corresponding ciphertext refers to at least one operation performed on the corresponding ciphertext from an initial state thereof until the arithmetic result RST.

For each of the plurality of ciphertexts CT, the encryption device 10 may recrypt the corresponding ciphertext to the recryption level determined for the corresponding ciphertext (S260). For example, the recryption circuit 100 in FIG. 2 may generate the plurality of recrypted ciphertexts CT_R by recrypting the plurality of ciphertexts CT to the recryption levels respectively corresponding to the plurality of ciphertexts CT.

FIG. 6 illustrates the arithmetic scenario SNR_A according to an example embodiment of the present disclosure. Particular descriptions of the arithmetic scenario SNR_A shown in FIG. 6 are merely for convenience of description of the example embodiment, and the inventive concept(s) described herein are not limited thereto. Regarding FIG. 6, descriptions will be made with reference to FIG. 6 together with FIG. 2.

In an embodiment, the arithmetic scenario SNR_A may include information about operations performed on the plurality of ciphertexts CT, which of the ciphertexts CT are used for each of the operations, and a level quantity consumed by each of the operations.

For example, according to the arithmetic scenario SNR_A of FIG. 6, the plurality of ciphertexts CT may include the first ciphertext CT1, the second ciphertext CT2, and the third ciphertext CT3. After a first operation OP1 is performed on the first ciphertext CT1 and the second ciphertext CT2, a second operation OP2 may be performed on the intermediate result RST_M, which is a result of the first operation OP1, and the third ciphertext CT3. In other words, the first ciphertext CT1 undergoes the first operation OP1 and the second operation OP2, the second ciphertext CT2 also undergoes the first operation OP1 and the second operation OP2, and the third ciphertext CT3 undergoes only the second operation OP2. A level consumption quantity Cons_L of the first operation OP1 may be "3", and the level consumption quantity Cons_L of the second operation OP2 may be "5". Here, each of the first operation OP1 and the second operation OP2 may include at least one multiplication operation, and levels of the ciphertexts undergoing each of the first operation OP1 and the second operation OP2 may be consumed due to the at least one multiplication operation included therein.

An embodiment, in which the recryption levels for the plurality of ciphertexts CT are determined according to such an arithmetic scenario SNR_A, will be described below with reference to FIG. 7.

Figure 7:
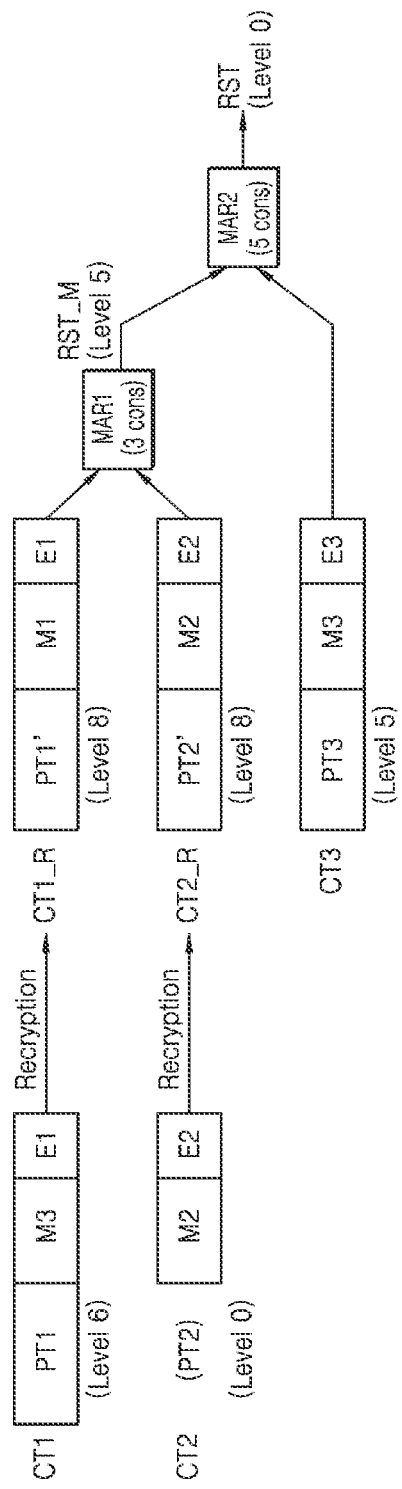
FIG. 7 is a conceptual diagram illustrating recryption and arithmetic processes according to an example embodiment of the present disclosure.

FIG. 7 is a conceptual diagram illustrating recryption and arithmetic processes according to an example embodiment of the present disclosure. In particular, FIG. 7 may be a conceptual diagram illustrating an embodiment of recryption level determination according to FIG. 5 and FIG. 6. Regarding FIG. 7, descriptions will be made with reference to FIG. 7 together with FIG. 2, FIG. 5, and FIG. 6.

In operation S220 in FIG. 5, the encryption device 10 may determine that level quantities consumed by the first operation OP1 and the second operation OP2 are "3" and "5", respectively, based on the arithmetic scenario SNR_A shown in FIG. 6.

In operation S240, the encryption device 10 may determine "8", which is the sum of the level quantities consumed by the first operation OP1 and the second operation OP2 performed on the first ciphertext CT1, as a recryption level corresponding to the first ciphertext CT1. The encryption device 10 may determine "8", which is the sum of the level quantities consumed by the first operation OP1 and the second operation OP2 performed on the second ciphertext CT2, as a recryption level corresponding to the second ciphertext CT2. The encryption device 10 may determine "5", which is the sum of the level quantity consumed by the second operation OP2 performed on the third ciphertext CT3, as a recryption level corresponding to the third ciphertext CT3.

In operation S260 in FIG. 5, the encryption device 10 may generate a recrypted first ciphertext CT1_R having a level of "8" by recrypting the first ciphertext CT1 having a level of "6", and may generate a recrypted second ciphertext CT2_R having a level of "8" by recrypting the second ciphertext CT2 having a level of "0". Because the third ciphertext CT3 has a level of "5", the recryption may not be performed on the third ciphertext CT3. Of course, the inventive concept(s) described herein are not limited to the details of recryption used in any example herein, and according to embodiments, when the level of the third ciphertext CT3 is less than 5, the recryption may also be performed on the third ciphertext CT3.

The encryption device 10 may obtain the intermediate result RST_M by performing an MAR1 operation including the first operation and an LSB removal operation, by using the recrypted first ciphertext CT1_R and the recrypted second ciphertext CT2_R. The encryption device 10 may obtain the arithmetic result RST by performing an MAR2 operation including the second operation and the LSB removal operation by using the intermediate result RST_M and the third ciphertext CT3. A level of the arithmetic result RST may be "0".

An encryption device according to a comparative example, in which the level of the arithmetic result is much greater than "0" may perform many unnecessary recryption operations. On the other hand, the encryption device 10 according to an example embodiment of the present disclosure may perform the recryption operation at a minimum in a required range. Accordingly, in the encryption device 10 according to an example embodiment of the present disclosure, the amount of computations in the recryption operation may be reduced, and the operating speed of the encryption device 10 may be improved.

FIG. 8 illustrates a parameter mapping table PMT according to an example embodiment of the present disclosure. The parameter mapping table PMT may correspond to the parameter mapping table PMT of FIG. 2. Regarding FIG. 8, descriptions will be made with reference to FIG. 8 together with FIG. 2.

The parameter mapping table PMT may include a plurality of recryption parameters corresponding to a plurality of operation combinations. Each operation combination may be a specific combination of operations in a specific order. For example, the parameter mapping table PMT may include a first recryption parameter P_R_1 corresponding to a first operation combination CO_1, a second recryption parameter P_R_2 corresponding to a second operation combination CO_2, and an $N^{-th}$ recryption parameter P_R_N corresponding to an $N^{-th}$ operation combination CO_N (where N is a natural number equal to or greater than 2).

Each of the plurality of recryption parameters may include a plurality of recryption levels for the plurality of ciphertexts CT. For example, the first recryption parameter P_R_1 may include a level value of L11 as a recryption level RL_1 for a first ciphertext, a level value of L21 as a recryption level RL_2 for a second ciphertext, and a level value of L31 as a recryption level RL_3 for a third ciphertext. Likewise, for example, the second recryption parameter P_R_2 may include a level value of L12 as the recryption level RL_1 for the first ciphertext, a level value of L22 as the recryption level RL_2 for the second ciphertext, and a level value of L32 as the recryption level RL_3 for the third ciphertext.

The parameter mapping table PMT may include a $k^{-th}$ recryption parameter P_R_k corresponding to a $k^{-th}$ operation combination CO_k (where k is a natural number). Referring to FIG. 6 and FIG. 7, when the $k^{-th}$ operation combination CO_k represents the first operation OP1 and the second operation OP2 performed in this stated order, the $k^{-th}$ recryption parameter P_R_k may include a value of "8" as the recryption level RL_1 for the first ciphertext, a value of "8" as the recryption level RL_2 for the second ciphertext, and a value of "5" as the recryption level RL_3 for the third ciphertext.

In an embodiment, the encryption device 10 may compare the parameter mapping table PMT with an operation combination included in the arithmetic scenario SNR_A. For example, the recryption parameter generating circuit 300 in FIG. 2 may select an operation combination included in the arithmetic scenario SNR_A from among the plurality of operation combinations included in the parameter mapping table PMT and may select a recryption parameter corresponding to the operation combination selected from among the plurality of recryption parameters included in the parameter mapping table PMT. The recryption parameter generating circuit 300 may provide the selected recryption parameter to the recryption circuit 100 in FIG. 2.

In an embodiment, the parameter mapping table PMT may be data that is stored in the memory 400 after the data is predetermined such that the plurality of recryption levels are determined for the plurality of ciphertexts according to the embodiments described with reference to FIG. 5, FIG. 6 and FIG. 7.

Figure 9:
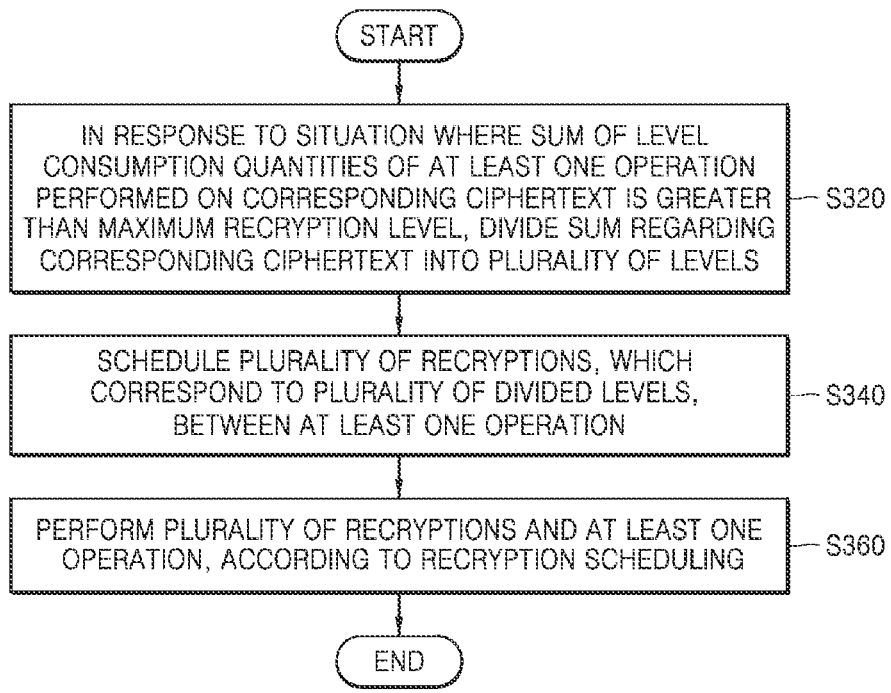
FIG. 9 illustrates a flowchart of a ciphertext arithmetic method performed by an encryption device, according to an example embodiment of the present disclosure.

FIG. 9 illustrates a flowchart of a ciphertext arithmetic method performed by an encryption device, according to an example embodiment of the present disclosure. In particular, FIG. 9 may illustrate an embodiment of the ciphertext arithmetic method when the sum in operation S240 of FIG. 5 is greater than a maximum recryption level. Regarding FIG. 9, descriptions will be made with reference to FIG. 9 together with FIG. 2 and FIG. 5.

In operation S240 regarding the particular ciphertext from among the plurality of ciphertexts CT, in response to a situation where the sum of the level consumption quantities of the at least one operation performed on the corresponding ciphertext is greater than the maximum recryption level, the encryption device 10 may divide the sum regarding the corresponding ciphertext into a plurality of levels (S320). Here, the encryption device 10 may divide the sum into the plurality of levels such that the number of levels is a value obtained by adding "1" to the quotient when the sum is divided by the maximum recryption level. For example, when the sum is "12" and the maximum recryption level is "10", the encryption device 10 may divide "12" into two levels such as (10, 2), (9,3), (8,4), (7,5), (6,6), (5,7), (4, 8), (3, 9), or (2, 10). In addition, for example, when the sum is "23" and the maximum recryption level is "10", the encryption device 10 may divide "23" into three levels such as (10, 10, 3) or the like.

In an embodiment, in operation S320, the encryption device 10 may divide a value obtained by adding a natural number that is not great, such as 1 to 3, to the sum into a plurality of levels. This is for preparing for the possibility that an expected level consumption quantity for an operation could vary with an environment of the encryption device 10, the type of data on which the operation is performed, the type of the operation performed, or the like, and that the arithmetic scenario SNR_A could be changed during the process.

The encryption device 10 may schedule a plurality of recryptions corresponding to the plurality of divided levels between the at least one operation performed on the corresponding ciphertext (S340). For example, the recryption parameter generating circuit 300 in FIG. 2 may schedule the plurality of recryptions corresponding to the plurality of divided levels between the at least one operation performed on the corresponding ciphertext.

The encryption device 10 may perform the plurality of recryptions and the at least one operation, according to the recryption scheduling in operation S340 (S360).

The flowchart of FIG. 9 will be described below in more detail with reference to FIG. 10, FIG. 11A and FIG. 11B.

FIG. 10 illustrates the arithmetic scenario SNR_A according to an example embodiment of the present disclosure. Particular descriptions of the arithmetic scenario SNR_A shown in FIG. 10 are merely for convenience of description, and the inventive concept(s) described herein are not limited to the details of any example embodiment described herein. Regarding FIG. 10, descriptions will be made with reference to FIG. 10 together with FIG. 2.

In an embodiment, the arithmetic scenario SNR_A may include information about operations performed on the plurality of ciphertexts CT, which of the ciphertexts CT are used for each of the operations, and a level quantity consumed in each of the operations.

For example, according to the arithmetic scenario SNR_A of FIG. 10, the plurality of ciphertexts CT may include the first ciphertext CT1, the second ciphertext CT2, and the third ciphertext CT3. After the first operation OP1 is performed on the first ciphertext CT1 and the second ciphertext CT2, the second operation OP2 may be performed on the intermediate result RST_M, which is a result of the first operation OP1, and the third ciphertext CT3. In other words, the first ciphertext CT1 undergoes the first operation OP1 and the second operation OP2, the second ciphertext CT2 also undergoes the first operation OP1 and the second operation OP2, and the third ciphertext CT3 undergoes only the second operation OP2. The level consumption quantity Cons_L of the first operation OP1 may be "7", and the level consumption quantity Cons_L of the second operation OP2 may be "5".

In addition, under the assumption that the maximum recryption level is "10", embodiments, in which recryption levels for the plurality of ciphertexts CT are determined according to the arithmetic scenario SNR_A, will be described below with reference to FIG. 11A and FIG. 11B.

Figure 11A:
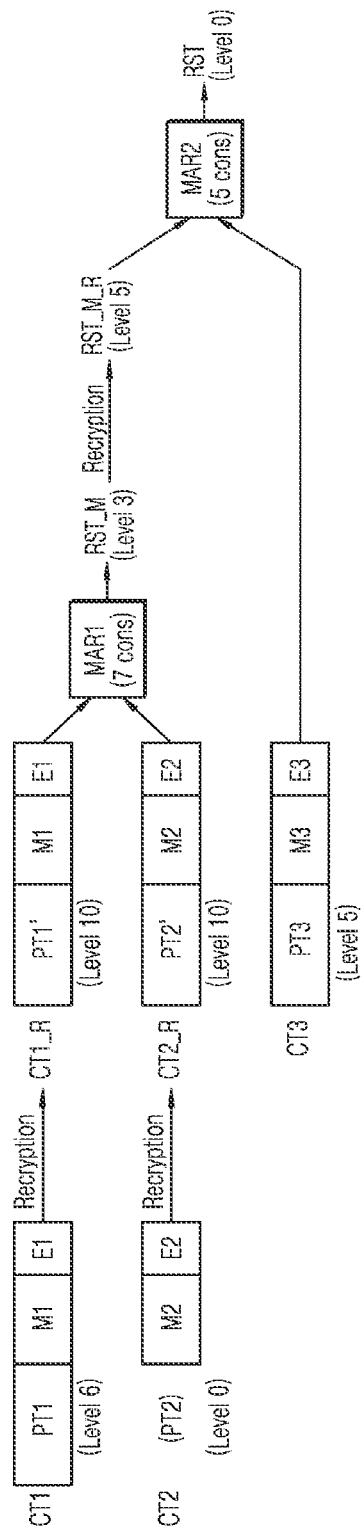
FIG. 11A and FIG. 11B each illustrate recryption and arithmetic processes according to an example embodiment of the present disclosure.
Figure 11B:
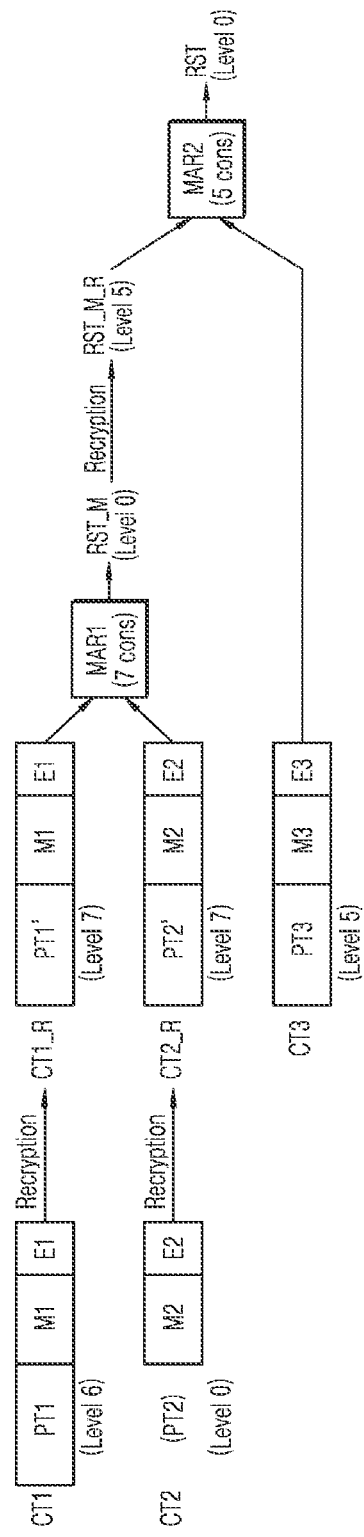

FIGS. 11A and 11B each illustrate recryption and arithmetic processes according to an example embodiment of the present disclosure. In particular, FIG. 11A and FIG. 11B may be conceptual diagrams illustrating embodiments of recryption level determination according to FIG. 9 and FIG. 10, respectively. Regarding FIG. 11A and FIG. 11B, descriptions will be made with reference to FIG. 11A and FIG. 11B together with FIG. 2, FIG. 9, and FIG. 10.

Referring first to FIG. 11A, in operation S320 in FIG. 9, in response to a situation where the level quantity consumed by the first operation OP1 and the second operation OP2 performed on the first ciphertext CT1 is "12" and thus greater than the maximum recryption level of "10", the encryption device 10 may divide "12" into two levels. For example, the encryption device 10 may divide "12" into "10" and "2".

In operation S340, the encryption device 10 may schedule recryption operations and arithmetic operations such that the recryption corresponding to "10", the first operation OP1, the recryption corresponding to "2", and the second operation OP2 are sequentially performed on the first cipher text CT1 in this stated order. For reference, the recryption corresponding to "10" in the recryption operation performed first may refer to performing the recryption such that the level becomes "10", and the recryption corresponding to "2" in the recryption operation performed next may refer to a recryption operation that increases the level by as much as "2". Likewise, the encryption device 10 may schedule recryption operations and arithmetic operations such that the recryption corresponding to "10", the first operation OP1, the recryption corresponding to "2", and the second operation OP2 are also sequentially performed on the second cipher text CT2 in this stated order.

In operation S360, the encryption device 10 may perform the recryption operations and the arithmetic operations according to the scheduling. For example, the arithmetic circuit 200 in FIG. 2 may obtain the intermediate result RST_M having a level of "3" by performing the MAR1 operation by using the recrypted first ciphertext CT1_R and the recrypted second ciphertext CT2_R. The arithmetic circuit 200 may provide the intermediate result RST_M to the recryption circuit 100 in FIG. 2, and the recryption circuit 100 may obtain a recrypted intermediate result RST_M_R by performing the recryption that increases the level of the intermediate result RST_M having a level of "3" by as much as "2". As a result, the level of the recrypted intermediate result RST_M_R may be "5".

Next, the encryption device 10 may obtain the arithmetic result RST having a level of "0" by performing the MAR2 operation by using the recrypted intermediate result RST_M_R and the third ciphertext CT3.

Next, referring to FIG. 11B, in operation S320 in FIG. 9, in response to a situation where the level quantity consumed by the first operation OP1 and the second operation OP2 performed on the first ciphertext CT1 is "12" and thus greater than the maximum recryption level of "10", the encryption device 10 may divide "12" into two levels. For example, the encryption device 10 may divide "12" into "7" and "5".

Subsequent operations S340 and S360 may be performed in a substantially identical manner to the descriptions made with reference to FIG. 11A.

That is, in the embodiment described with reference to FIG. 11A, in dividing the sum of the level consumption quantities of the at least one operation performed on the corresponding ciphertext into the plurality of levels, the encryption device 10 may divide, first, the sum into levels including the maximum recryption levels (i.e., 10 in this example), and then, the last remaining value may be included in a remaining level.

In the embodiment described with reference to FIG. 11B, unlike FIG. 11A, in dividing the sum of the level consumption quantities of the at least one operation performed on the corresponding ciphertext into the plurality of levels, the encryption device 10 may allocate a level first by as much as a level quantity consumed by the first operation OP1 (i.e., 7 in this example), and the remaining value may be included in the remaining level.

Figure 12:
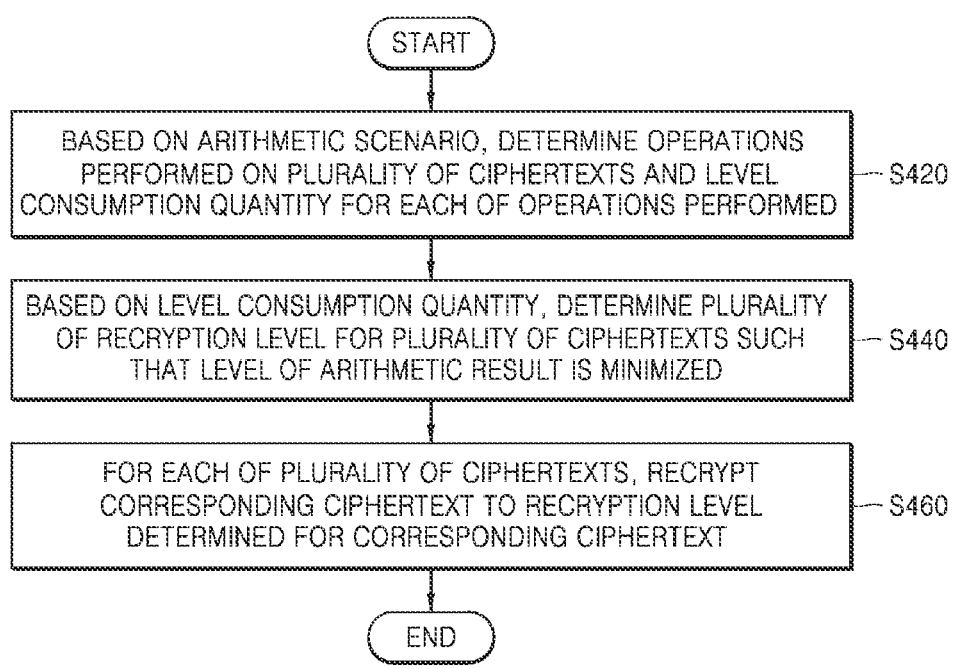
FIG. 12 illustrates a flowchart of a ciphertext arithmetic method performed by an encryption device, according to an example embodiment of the present disclosure.

FIG. 12 illustrates a flowchart of a ciphertext arithmetic method performed by an encryption device, according to an example embodiment of the present disclosure. Regarding FIG. 12, descriptions will be made with reference to FIG. 12 together with FIG. 2.

At S420, the encryption device 10 may determine operations performed on the plurality of ciphertexts CT and a level consumption quantity for each of the operations performed, based on the arithmetic scenario SNR_A.

At S440, the encryption device 10 may determine a plurality of recryption levels for the plurality of ciphertexts CT such that the level of the arithmetic result RST is minimized, based on the level consumption quantities determined in operation S420. For example, the recryption parameter generating circuit 300 in FIG. 2 may optimize the plurality of recryption levels such that the level of the arithmetic result RST is minimized. In an embodiment, the recryption parameter generating circuit 300 may generate the plurality of recryption levels such that the level of the arithmetic result RST is "0".

At S460, for each of the plurality of ciphertexts CT, the encryption device 10 may recrypt the corresponding ciphertext to a recryption level determined for the corresponding ciphertext. For example, the recryption circuit 100 in FIG. 2 may generate the plurality of recrypted ciphertexts CT_R by recrypting the plurality of ciphertexts CT to the recryption levels respectively corresponding to the plurality of ciphertexts CT.

Figure 13:
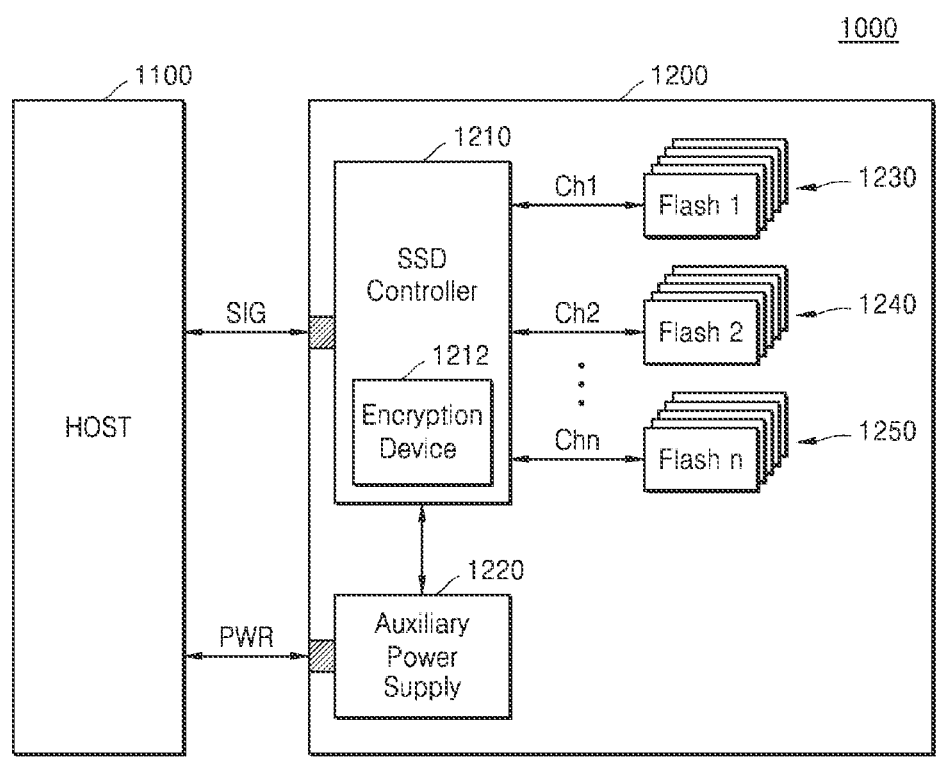
FIG. 13 illustrates a solid-state drive (SSD) system according to an example embodiment of the present disclosure.

FIG. 13 illustrates a SSD system 1000 (solid-state drive (SSD) system) according to an example embodiment of the present disclosure.

The SSD system 1000 may include a host 1100 and an SSD 1200. The SSD 1200 may transmit signals to and receive signals from the host 1100 via a signal connector (SIG) and may receive power via a power connector (PWR). The SSD 1200 may include an SSD controller 1210, an auxiliary power supply 1220, and a plurality of flash memory devices 1230, 1240, and 1250.

Here, the SSD controller 1210 may include an encryption device 1212, and the encryption device 1212 may be implemented by using the embodiments shown in FIGS. 1 to 12.

While the inventive concept(s) described herein have been particularly shown and described with reference to embodiments thereof, it will be understood that various changes in form and details may be made therein without departing from the spirit and scope of the following claims.

What is claimed is:

1. A homomorphic encryption device, comprising:
   a recryption parameter generating circuit configured to, based on an arithmetic scenario comprising information about an arithmetic schedule between a plurality of ciphertexts, generate a recryption parameter comprising a plurality of recryption levels respectively for the plurality of ciphertexts, and schedule a plurality of recryptions between at least one operation performed on a corresponding ciphertext, the plurality of recryptions corresponding to a plurality of levels that are divided;
   a recryption circuit configured to generate a plurality of recrypted ciphertexts by recrypting each of the plurality of ciphertexts to a corresponding recryption level, based on the recryption parameter;
   an arithmetic circuit configured to output an arithmetic result by performing operations by using the plurality of recrypted ciphertexts, according to the arithmetic scenario.

2. The homomorphic encryption device of claim 1, wherein at least two of the plurality of recryption levels respectively corresponding to the plurality of ciphertexts are different from each other.

3. The homomorphic encryption device of claim 1, wherein the recryption parameter generating circuit is further configured to:
   determine level consumption quantities of at least one operation comprised in the arithmetic scenario; and
   generate the recryption parameter based on the determined level consumption quantities of the at least one operation.

4. The homomorphic encryption device of claim 3, wherein the recryption parameter generating circuit is further configured to, for each of the plurality of ciphertexts, determine a sum of level consumption quantities of at least one operation performed on a corresponding ciphertext, as a recryption level of the corresponding ciphertext.

5. The homomorphic encryption device of claim 4, wherein the recryption parameter generating circuit is further configured to:
   in response to a situation where the sum of the level consumption quantities of the at least one operation performed on the corresponding ciphertext is greater than a maximum recryption level, divide the sum into the plurality of levels that are divided such that each of the plurality of levels is less than or equal to the maximum recryption level.

6. The homomorphic encryption device of claim 5, wherein a number of levels corresponds to a value obtained by adding "1" to a quotient when the sum is divided by the maximum recryption level.

7. The homomorphic encryption device of claim 3, wherein the recryption parameter generating circuit is further configured to, based on the determined level consumption quantities of the at least one operation, generate the recryption parameter such that a level of the arithmetic result is minimized.

8. The homomorphic encryption device of claim 7, wherein the recryption parameter generating circuit is further configured to generate the recryption parameter such that the level of the arithmetic result is "0".

9. A ciphertext arithmetic method performed by a homomorphic encryption device, the ciphertext arithmetic method comprising:
   determining a plurality of recryption levels for a plurality of ciphertexts, based on an arithmetic scenario comprising information about an arithmetic schedule for the plurality of ciphertexts;
   recrypting each of the plurality of ciphertexts to a corresponding recryption level from among the plurality of recryption levels; and
   outputting an arithmetic result by performing operations comprising at least one multiplication operation by using the plurality of recrypted ciphertexts,
   wherein at least two of the plurality of recryption levels are different from each other,
   wherein a remaining number of possible arithmetic operations of the recrypted ciphertexts is larger than a remaining number of possible arithmetic operations of the plurality of ciphertexts.

10. The ciphertext arithmetic method of claim 9, wherein the determining of the plurality of recryption levels comprises:
   obtaining a parameter mapping table comprising a plurality of recryption parameters that correspond to a plurality of operation combinations; and
   based on comparing the parameter mapping table with an operation combination comprised in the arithmetic scenario, determining the plurality of recryption levels according to a recryption parameter corresponding to the operation combination.

11. The ciphertext arithmetic method of claim 9, wherein the determining of the plurality of recryption levels comprises:
    determining a level consumption quantity for each of at least one operation comprised in the arithmetic scenario; and
    for each of the plurality of ciphertexts, determining a corresponding recryption level, based on the determined level consumption quantities of the at least one operation.

12. The ciphertext arithmetic method of claim 11, wherein the determining of the corresponding recryption level comprises determining a sum of level consumption quantities of at least one operation performed on a corresponding ciphertext from among the plurality of ciphertexts, as a recryption level that corresponds to the corresponding ciphertext.

13. The ciphertext arithmetic method of claim 11, wherein the determining of the corresponding recryption level comprises:
    in response to a situation where a sum of level consumption quantities of at least one operation performed on a corresponding ciphertext from among the plurality of ciphertexts is less than or equal to a maximum recryption level, determining the sum as a recryption level of the corresponding ciphertext; and
    in response to a situation where the sum is greater than the maximum recryption level, by dividing the sum into a plurality of levels, scheduling a plurality of recryptions, which correspond to the plurality of levels that are divided, between the at least one operation performed on the corresponding ciphertext.

14. The ciphertext arithmetic method of claim 9, wherein the determining of the plurality of recryption levels comprises, based on a level consumption quantity for each of at least one operation comprised in the arithmetic scenario, determining, as the plurality of recryption levels, levels optimized such that a level of the arithmetic result is minimized.

15. The ciphertext arithmetic method of claim 9, wherein the determining of the plurality of recryption levels comprises, by comparing a parameter mapping table, which comprises a plurality of recryption parameters corresponding to a plurality of operation combinations stored in the homomorphic encryption device, with an operation combination comprised in the arithmetic scenario, determining, as the plurality of recryption levels, levels comprised in a recryption parameter corresponding to the operation combination comprised in the arithmetic scenario.

16. A ciphertext arithmetic method performed by a homomorphic encryption device, the ciphertext arithmetic method comprising:
    receiving a plurality of ciphertexts from outside the homomorphic encryption device;
    receiving a parameter mapping table that comprises a plurality of recryption parameters corresponding to a plurality of operation combinations; and
    by comparing the parameter mapping table with an operation combination comprised in an arithmetic scenario, outputting a recryption parameter corresponding to the operation combination comprised in the arithmetic scenario;
    based on types and orders of operations required between the plurality of ciphertexts, recrypting the plurality of ciphertexts as a plurality of recrypted ciphertexts to recryption levels respectively corresponding to the plurality of recrypted ciphertexts such that an arithmetic result comprises no preliminary text; and
    outputting the arithmetic result comprising no preliminary text by performing operations comprising at least one multiplication operation by using the plurality of recrypted ciphertexts.

17. The ciphertext arithmetic method of claim 16, wherein the recrypting of the plurality of ciphertexts comprises:
    for each of the plurality of ciphertexts, determining a sum of level consumption quantities of at least one operation performed on a corresponding ciphertext, as a recryption level that corresponds to the corresponding ciphertext; and
    for each of the plurality of ciphertexts, recrypting the corresponding ciphertext to the recryption level.

18. The ciphertext arithmetic method of claim 17, wherein the determining of the sum of the level consumption quantities of the at least one operation as the recryption level that corresponds to the corresponding ciphertext comprises, in response to a situation where the sum is greater than a maximum recryption level, by dividing the sum into a plurality of levels, scheduling a plurality of recryptions, which correspond to the plurality of levels that are divided, between the at least one operation performed on the corresponding ciphertext.

19. The ciphertext arithmetic method of claim 18, wherein the determining of the sum of the level consumption quantities of the at least one operation as the recryption level that corresponds to the corresponding ciphertext comprises, in response to a situation where the sum is less than and equal to the maximum recryption level, determining the sum as the recryption level of the corresponding ciphertext.

* * * * *